United States Patent [19]

Murate et al.

[11] Patent Number: 4,855,674

[45] Date of Patent: Aug. 8, 1989

[54] METHOD AND A PROCESS CONTROL SYSTEM USING THE METHOD FOR MINIMIZING HUNTING

[75] Inventors: Tsuneo Murate, Kamakura; Shin Suzuki, Yokohama, both of Japan

[73] Assignee: Yamatake-Honeywell Company Limited, Tokyo, Japan

[21] Appl. No.: 20,932

[22] Filed: Mar. 2, 1987

[30] Foreign Application Priority Data

Mar. 11, 1986 [JP] Japan .................................. 61-53172

[51] Int. Cl.⁴ ...................... G01R 35/00; G05B 13/02; G05B 11/42
[52] U.S. Cl. ................................ 324/158 R; 318/610; 364/157; 364/162
[58] Field of Search ........ 324/158 R, 83 FM, 83 EM, 324/74; 318/610; 364/162, 157

[56] References Cited

U.S. PATENT DOCUMENTS

| | | | |
|---|---|---|---|
| 4,336,594 | 6/1982 | Masuzawa et al. | 318/588 |
| 4,408,148 | 10/1983 | Herzog | 318/610 |
| 4,466,054 | 8/1984 | Shigemasa et al. | 364/162 |
| 4,580,208 | 4/1986 | Sukimoto et al. | 318/610 |
| 4,603,674 | 8/1986 | Tanaka | 123/575 |
| 4,675,805 | 6/1987 | Freymann | 364/162 |
| 4,702,210 | 10/1987 | Yasuoka et al. | 123/339 |
| 4,748,953 | 6/1988 | Osuga et al. | 123/489 |

*Primary Examiner*—Ernest F. Karlsen
*Attorney, Agent, or Firm*—Mitchell J. Halista; Albin Medved

[57] ABSTRACT

A method for process control to minimize hunting using a controller wherein a PID arithmetic operation is performed with respect to a deviation of a setting parameter and a processed variable fed back from a process, and a resultant manipulation variable is applied to the process including the steps of monitoring the waveforms of the setting parameter and the processed variable from the process to obtain an oscillation period of the deviation, identifying process characteristics of the process, obtaining a phase angle of a frequency response of an open-loop transfer function of a system from the oscillation period and the process characteristics, and detecting a hunting of the process by the magnitude of the phase angle. A process control system includes a self-tuning controller having a control means for performing a PID arithmetic operation with respect to a deviation between a setting parameter and a processed variable fed back from a process, process identification means for identifying process characteristics and determining optimal PID parameters, monitoring means for monitoring the waveforms of the setting parameter and the processed variable from the process to obtain an oscillation period of the deviation, means for obtaining a phase angle of a frequency response of an open-loop transfer function of the process obtained from the oscillation period and process characteristics, means for detecting a hunting of the process by the magnitude of the phase angle, and means for performing a tuning operation of the controller in accordance with the detecting result by the means for detecting.

6 Claims, 3 Drawing Sheets

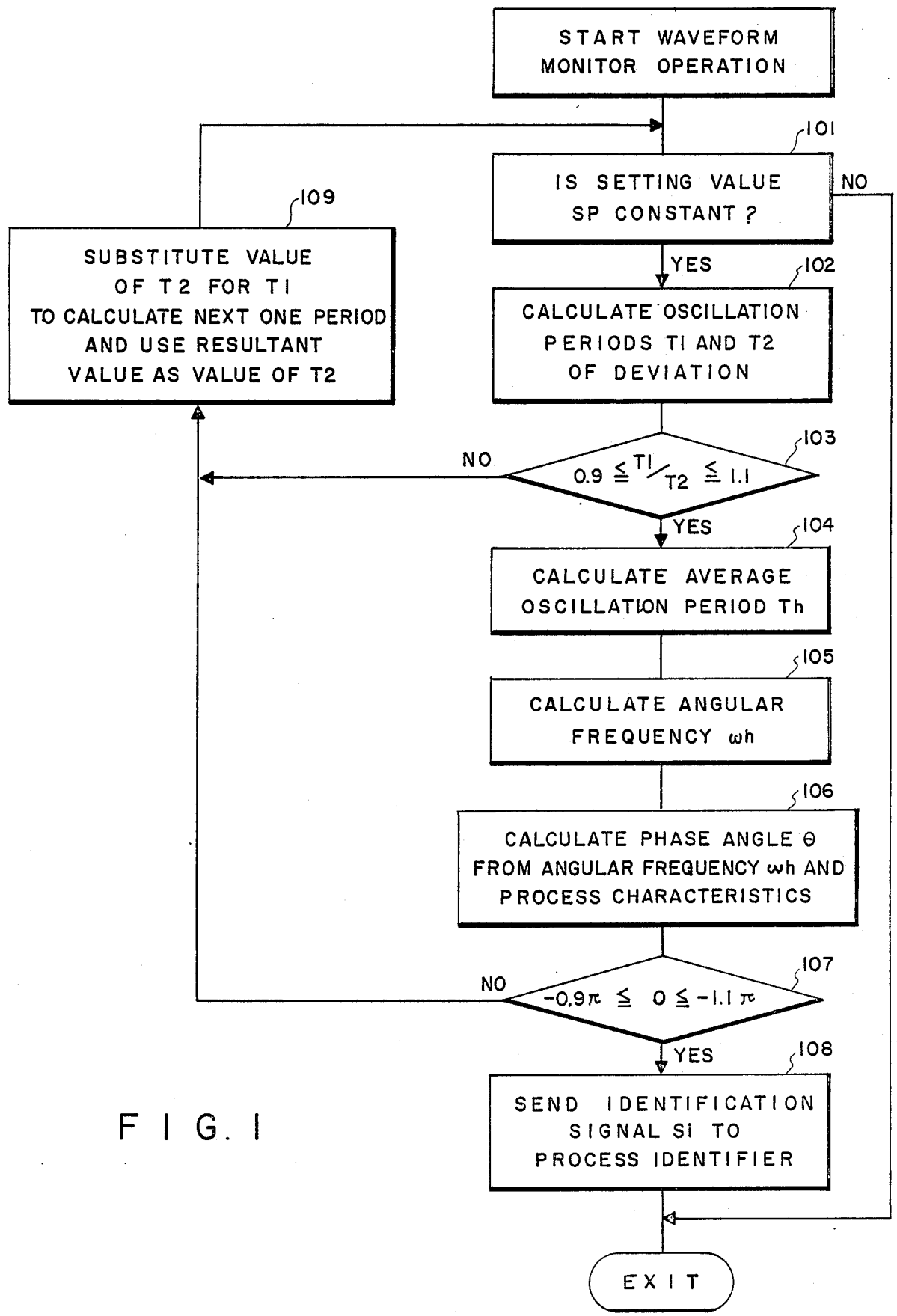
F I G. 1

METHOD AND A PROCESS CONTROL SYSTEM USING THE METHOD FOR MINIMIZING HUNTING

BACKGROUND OF THE INVENTION

1. Field of the Invention

The present invention relates to process control systems. More specifically, the present invention is directed to a method and a process control system utilizing the method in a process controller for minimizing hunting of the process.

2. Description of the Prior Art

In order to perform satisfactory process control using a feedback control system, hunting of a process must be detected at an early stage, and an appropriate countermeasure taken to minimize the hunting. In one conventional system for detecting hunting, when a deviation ($e = sp - pv$) of a process variable (pv) with respect to a setting parameter (sp) has exceeded a predetermined threshold value $e_{th}$, it is thereby determined that hunting has occurred. If the deviation temporarily increases for any reason, this must be prevented from being interpreted as hunting. For this purpose, an oscillation period of a manipulation variable (mv) and a process variable (pv) with respect to a process is calculated, and an interpretation is made based on a change in oscillation period.

In the conventional hunting discriminating system, however, hunting can be detected only after the deviation (or the amplitude of an oscillation waveform) is considerably increased. When the beginning of PID parameter tuning depends only on an operator's request and if process characteristics naturally change, an old PID parameter is left untuned, and optimal control is disabled. In addition, detection timing of hunting is undesirably delayed. In any case, hunting must be detected at an early stage.

SUMMARY OF THE INVENTION

An object of the present invention is to provide an improved method and a process control system using the method for minimizing hunting of the process.

In accomplishing this and other objects, there has been provided, in accordance with the present invention, a method for minimizing hunting of a controlled process using a controller wherein a PID arithmetic operation is performed with respect to a deviation of a setting parameter and a processed variable fed back from a process, and a resultant manipulation variable is applied to the process including the steps of monitoring the waveforms of the setting parameter and the processed variable from the process to obtain an oscillation period of the deviation, identifying process characteristics of the process, obtaining a phase angle of a frequency response of an open-loop transfer function of a system from the oscillation period and process characteristics, and detecting the hunting of the process by the magnitude of the phase angle. A process control system utilizing this method comprises a controller having a control means for performing a PID arithmetic operation with respect to a deviation between a setting parameter and a processed variable fed back from a process, process identification means for identifying process characteristics, monitoring means for monitoring the waveforms of the setting parameter and the processed variable from the process to obtain an oscillation period of the deviation, means for obtaining a phase angle of a frequency response of an open-loop transfer function of the process obtained from the oscillation period and process characteristics, means for detecting a hunting of the process by the magnitude of the phase angle, and means for subsequently performing a tuning operation of the controller in accordance with the detecting result by the means for detecting.

BRIEF DESCRIPTION OF THE DRAWINGS

A better understanding of the present invention may be had when the following description is read in connection with the accompanying drawings, in which:

FIG. 1 is a flow chart showing the operation a waveform monitor according to the method of the present invention.

DESCRIPTION OF THE PREFERRED EMBODIMENT

In the hunting discriminating or detecting system of the present invention, the waveforms of a setting parameter and a process variable are continuously monitored, and a phase angle of a frequency response of an open-loop transfer function of a process and controller system is obtained from an oscillation period of a deviation and process characteristics, and hunting of the process is detected from the magnitude of the phase angle. In a process tuning system utilizing the present invention, PID parameter tuning is performed in accordance with the hunting discrimination result. It is known that the process system is rendered unstable due to process variations or the like when the phase angle is close to "$-\pi$". Therefore, hunting can be detected in accordance with whether or not the phase angle falls within a predetermined range having "$-\pi$" as the center point. When the hunting discrimination result is obtained, tuning is started, and new, optimal PID parameters are obtained.

Figure 2:
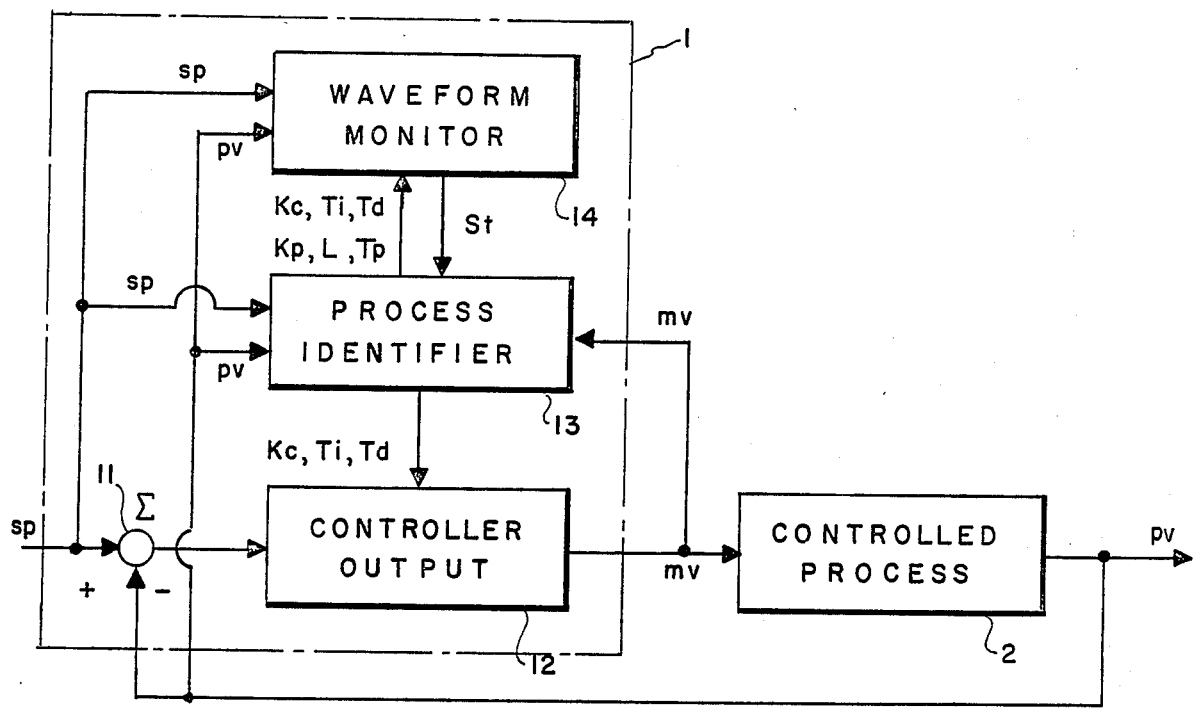
FIG. 2 is a block diagram of a process control system embodying an example of the present invention.

FIG. 2 is a block diagram of a process control system according to an embodiment of the present invention. Referring to FIG. 2, reference numeral 1 denotes a self-tuning controller; and reference number 2 denotes a controlled object, e.g., a process. The controller 1 comprises an adder (subtractor) 11 for calculating a deviation $e = sp - pv$ between a setting parameter "sp" and a processed variable "pv" which is fed back from the process 2, a controller 12 for outputting, to the process 2, a manipulation variable "mv" which is obtained through PID arithmetic operation with respect to the deviation "e", a process identifier 13 for identifying process characteristics, and determining and outputting optimal PID parameters to the controller 12, and a waveform monitor 14 for discriminating hunting of the process and sending a signal for starting tuning of the PID parameters (in other words, identification of the process characteristics) to the identifier 13.

In the above arrangement, the process is already identified as a system of an idle time "L" and a primary delay "Tp" by the identifier 13 of the self-tuning controller 1. At this time, a PID parameter can be calculated by the Nichols' equation in accordance with process types of a controller (i.e., PI, DPI, PID and the like). Optimal parameters are given as follows:
Proportional Gain: Kc
Integration Time: Ti
Differentiation Time: Td In order to obtain a transfer function Gc(S) (where S is the Laplace operator) in PID control, the transfer function is approximated using the above parameters as:

$$Gc(S) = Kc\{1 + (1/Tis) + Tds\} \quad (1)$$

If the process 2 is identified as the system of the idle time L and the primary delay Tp, the transfer function Gp(S) of the process is expressed by:

$$Gp(S) = (Kp \cdot e^{-LS})/(1 + Tps) \quad (2)$$

Therefore, a frequency response $\Delta(j\omega)$ of an open-loop transfer function $\Delta(S)$ of the system consisting of the controller 1 and the process 2 can be expressed by:

$$(S) = Gc(S) \cdot Gp(S) \quad (3)$$

This yields:

$$\Delta(j\omega) = Ge(j\omega) \quad (4)$$

$$\text{Gain of } \Delta(j\omega): g = g1 + g2 \quad (5)$$

Phase angle of $$\Delta(j\omega): \theta = \theta1 + \theta2 \quad (6)$$

g1, g2, $\theta$1 and $\theta$2 in equations (5) and (6) are then calculated.

From equation (1), the frequency response Gc(j) of the transfer function of the controller 1 can be rewritten as:

$$Gc(j\omega) = Kc\{1 + (1/jTi) + J\omega Td)\} = Kc[1 - j \cdot \{(1 - \omega^2 TiTd)/Ti\}] \quad (7)$$

Therefore, $$\text{Gain } g1 = 20 \log Kc\sqrt{1 + \{(1 - \omega^2 TiTd)/\omega Ti\}^2} \quad (8)$$

Phase angle
$$\theta1 = \angle\{1 - j \cdot \{(1 - \omega^2 TiTd)/\omega Ti = \tan^{-1}\{-(1 - \omega^2 TiTd)/\omega Ti\} \quad (9)$$

Meanwhile, from equation (2), the frequency response Gp(j$\omega$) of the transfer function of the process can be expressed by:

$$Gp(j\omega) = (Kp \cdot e^{-j\omega L})/(1 + j\omega Tp) \quad (10)$$

Therefore,
Gain $g2 = 20 \log Kp - 20 \log |e^{j\omega L}(1 + j\omega Tp) = 20 \log Kp - 20 \log \sqrt{1 + (\omega Tp)^2}$ (11)

Phase angle
$$\theta2 = -\angle e^{j\omega L} - \angle(1 + j\omega Tp) = -\{\omega L + \tan^{-1}(\omega Tp)\} \quad (12)$$

From equations (5), (8), and (11), therefore, the gain "g" of the frequency response $\Delta(j\omega)$ of the open-loop transfer function is expressed by:

$$g = 20 \log Kc\sqrt{1 + \{(1 - \omega^2 TiTd)/\omega Ti\}^2} + 20 \log Kp - 20 \log 1 + (\omega Tp)^2 \quad (13)$$

From equations (6), (9), and (12), the phase angle $\theta$ of the frequency response (j) of the open-loop transfer function is expressed by:

$$\theta = \tan^{-1}\{-(1 - \omega^2 TiTd)/Ti\} - \omega L - \tan^{-1}(\omega Tp) \quad (14)$$

Figure 3:
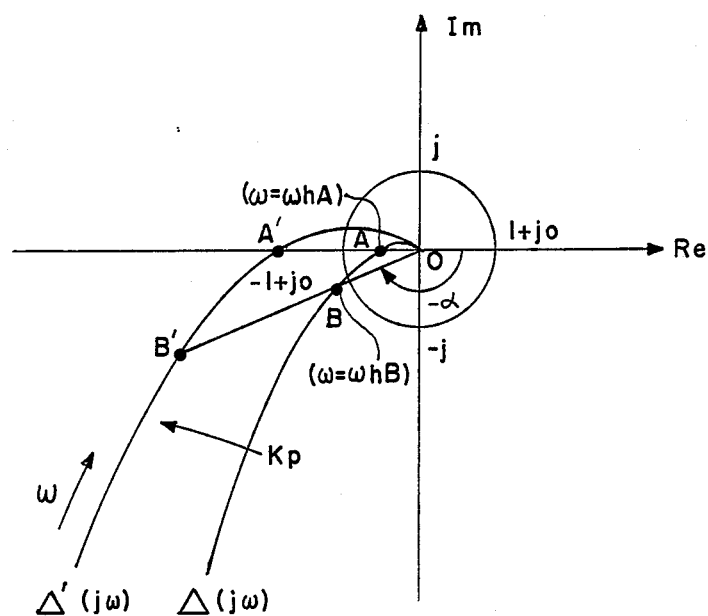
FIG. 3 is a Nyquist diagram of an open-loop transfer function used in the present invention.

The Nyquist diagram of the frequency response $\Delta(j\omega)$ of the open-loop transfer function represented by equations (13) and (14) is as shown in FIG. 3. Referring to FIG. 3, point A ($\omega = \omega_{hA}$) and point B ($\omega = \omega_{hB}$) are plotted on the curve of $\Delta(j\omega)$. If only a process gain is increased for any cause, and other parameters are not changed, the gain g is increased and the phase angle $\theta$ is not changed from equations (13) and (14). Therefore, the curve of $\Delta(j\omega)$ is moved to $\Delta'(j\omega)$, as indicated by the arrow, and the points A and B are moved respectively to points A' and B'. A unit circle which has the origin O as the center and a radius 1 is drawn. The points B and B' are located outside the circle, and no self-oscillation occurs although the gain is larger than one. This is because the points B and B' do not satisfy a condition $\theta = -\pi$ for oscillation, where the phase angle $\theta = -\pi$. In contract to this, both the points A and A' have the phase angle $\theta = -\pi$. The system of point A is stable because it is located inside the circle. However, the point A is easily moved to the point A' due to an increase in process gain, and self-oscillation is started.

Figure 4:
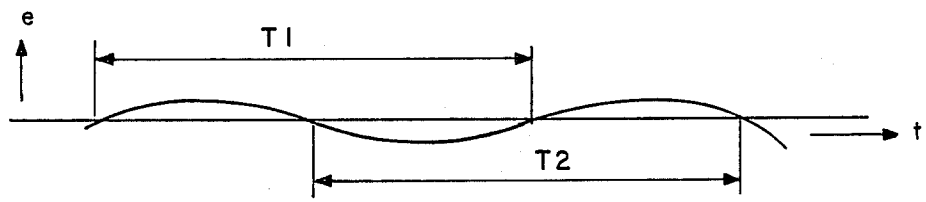
FIG. 4 is an oscillation waveform of a deviation as used in the present invention and FIG. 5 is a waveform illustrating a conventional hunting detection system.
Figure 5:
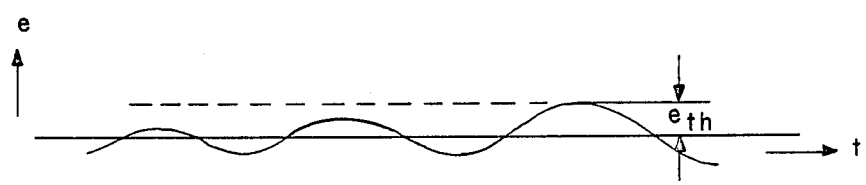

In order to discriminate whether a process tends to be unstable, the oscillation waveform of a deviation $e = sp - pv$ of a process system as shown in FIG. 4 is continuously monitored, first and second oscillation periods T1 and T2 are obtained at times delayed by half the period, and an oscillation period $T_h$ is determined from the average value of the periods T1 and T2.

$$T_h = (T1 + T2)/2 \quad (15)$$

An angular frequency $\omega_h$ can be calculted as:

$$\omega_h = 2\pi/T_h \quad (16)$$

The formula for calculating the phase angle $\theta$ of the open-loop transfer function $\Delta(j\omega)$ is given as equation (14). As described above, the process parameters (i.e., the idle time L, the primary delay Tp and process gain Kp) obtained by the identification mechanism 13 and PID parameters (i.e., the controller gain Kc, the integration time Ti, and the differentiation time Td) are substituted in this equation, and the angular frequency $\omega_h$ given by equation (16) from the oscillation period $T_h$ is also substituted, thereby calculating the phase angle $\theta$.

If the phase angle $\theta$ is close to $-\pi$, as described above, it is assumed that the system can be easily rendered unstable by causes such as process variations. Therefore, in this embodiment, this range is determined as:

$$-0.9\pi \leq \theta \leq -1.1\pi \quad (17)$$

When $\theta$ calculated by equation (14) falls within this range, the waveform monitor 14 sends a process identification signal St to the identifier 13 irrespective of the gain "g" of the frequency response $\Delta(j\omega)$ of the open-loop transfer function, thereby producing re-identification.

In response to the identification signal St, the identifier 13 identifies the varied process, sets new PID parameters accordingly, and supplies then to the controller 12. Since the controller 12 starts its control using the new PID parameters, the Nyquist diagram of the open-loop transfer function is derived from $\Delta'(j\omega)$ to $\Delta(j\omega)$ as shown in FIG. 3, and stable control can be continued.

The self-tuning controller 1 can be constituted by combining independent circuit components. Alternatively, a microcomputer can be used, and the function equivalent to the controller 1 can be executed by a program pre-stored in a computer memory. In this case, the adder 11, the controller 12, the identifier 13, and the waveform monitor 14 can be realized by corresponding programs. FIG. 1 shows an example of a flow chart of a program corresponding to the operation of the waveform monitor circuit 14.

Referring to FIG. 1, when execution of the program enters the waveform monitor operation program, the controller 1 checks the presence/absence of a change in setting parameter sp (step 101). In this embodiment, hunting discrimination is made when the setting parameter "sp" is constant. If the parameter "sp" is constant, the oscillation periods T1 and T2 of the deviation "e" are calculated (step 102). In this case, the deviation "e" is monitored in an appropriate sampling period, and waveform monitoring for 1.5 periods is performed upon inversion of the sign of the deviation "e". When the two oscillation periods T1 and T2 which are delayed by half the period are not the same, these periods are ignored as errors. In this embodiment, only when the resultant periods satisfy the following relation (step 103) $0.9 \leq T1/T2 \leq 1.1$, are they adopted as normal parameters.

An average value $T_h$ of these oscillation periods is then calculated (step 104), the angular frequency $\omega_h$ is calculated from the oscillation period $T_h$ (step 105), and the phase angle $\theta$ is also calculated therefrom (step 106). It is next checked if the calculated phase angle falls within the predetermined range, thereby discriminating hunting (step 107). If hunting is discriminated, the identification signal St is supplied to the identifier 13, thereby initiating a tuning start of the PID parameters (step 108). As described above, since the operation of the identifier 13 is also realized by the program corresponding thereto, the sending operation of the identification signal St is realized thereby, e.g., setting a predetermined flag in a predetermined area of the memory.

When an error occurs, that is, T1/T2 falls outside the predetermined range (step 103), the following check operations are not performed. If the phase angle falls outside the predetermined range and the stability is kept (step 107), the value of T2 is used as the value of T1 without initiating a tuning start. After the oscillation period T2 which is delayed from the new value of T1 by half the period is calculated (step 109), step 101 is executed.

When the identification signal St is sent (step 108) and the setting parameter "sp" varies (step 101), the waveform monitor program is ended. In this manner, the phase angle $\theta$ is calculated in real time and hunting is discriminated. If the hunting is detected, tuning is immediately performed. Optimal control can be performed for a process requiring a high-speed response, resulting in convenience.

In equation (2), since the process identification mechanism functions near an equilibrium point of a limit cycle, in practice, the first term "1" of the denominator of the right side can be omitted. If such approximation is made, equation (14) can be rewritten as:

$$= \tan^{-1}\{-(1-\omega^2 TiTd)/\omega Ti\} - \omega L - (\pi/2) \qquad (14')$$

Hunting discrimination can be similarly performed using the phase angle $\theta$ obtained by equation (14').

The preceding discussion is directed to an example wherein the present invention is applied to the self-tuning controller 1 comprising the controller 12 and the identification mechanism 13. This system is suitable for a case wherein a phase angle is continuously calculated using process characteristics identified by the identifier 13, hunting discrimination is made in real time, and control for keeping stability is performed. The hunting discrimination system of the present invention is not limited to this case. If the process characteristics can be obtained, the present invention can be applied to a normal controller. As a result of hunting discrimination, tuning can be performed immediately or later whereby the present invention is not limited to real-time control.

According to the present invention as described above, a phase angle of a frequency response of an open-loop transfer function of a feedback loop is obtained from process characteristics and an oscillation period of a deviation obtained through waveform monitor of a setting parameter and a processed variable, and it is used to determine whether or not a system may become unstable. Therefore, hunting of a process can be detected by a smaller oscillation than in a conventional system. More specifically, an increase in gain in an unstable direction can be detected earlier. Process tuning is performed based on the hunting discrimination result. Therefore, the process can be reliably and optimally controlled, resulting in high efficiency and low cost. Since hunting discrimination is made using the phase angle, detection can be free from the influence of noise unlike the conventional case of using the absolute value of a deviation.

Accordingly, it may be seen that there has been provided, in accordance with the present invention, a method and an apparatus using the method for process control to minimize hunting.

The embodiments of the present invention in which an exclusive property or privilege is claimed are defined as follows:

1. A method for process control to minimize hunting using a controller wherein a PID arithmetic operation is performed with respect to a deviation between a setting parameter and a processed variable fed back from a process and a resultant manipulation variable is applied to the process including the steps of monitoring the waveforms of the setting parameter and the processed variable from the process to obtain an oscillation period of the deviation, identifying process characteristics of the process, obtaining a phase angle of a frequency response of an open-loop transfer function of the process from the oscillation period and the process characteristics, and detecting a hunting of the process by the magnitude of the phase angle.

2. A method for process control according to claim 1, and including the further steps following the detection of the hunting of the process of determining optimal PID parameters and tuning the controller to the optimal PID parameters.

3. A process control system comprising
a controller having a control means for performing a PID arithmetic operation with respect to a deviation between a setting parameter and a processed variable feed back from a process, process identification means for identifying process characteristics, monitoring means for monitoring the waveforms of the setting parameter and the processed variable from the process to obtain an oscillation period of the deviation, means for obtaining a phase angle of a frequency response of an open-loop transfer function of the process obtained from the oscillation period and process characteristics, means for detecting a hunting of the process by the magnitude of the phase angle, and means for subsequently performing a tuning operation of said controller in accordance with the detecting result by said means for detecting.

4. A process control system according to claim 3 wherein said controller is a self-tuning controller determining optimal PID parameters and the phase angle is continuously calculated to detect hunting and the tuning operation is immediately performed when hunting is detected.

5. A process control system as set forth in claim 4 wherein said self-tuning controller includes a digital computer utilizing a stored program.

6. A method as set forth in claim 1 wherein the controller is a self-tuning controller determining optimal PID parameters, the phase angle is continuously calculated and the tuning operation is immediately performed when hunting is detected.

* * * * *